(12) United States Patent
Gerstenberger et al.

(10) Patent No.: US 11,968,932 B2
(45) Date of Patent: Apr. 30, 2024

(54) GARDEN AND/OR FORESTRY SYSTEM

(71) Applicant: Andreas Stihl AG & Co. KG, Waiblingen (DE)

(72) Inventors: Oliver Gerstenberger, Ditzingen (DE); Maximilian Eberhardt, Esslingen (DE); Jan Kurzenberger, Koengen (DE); Benjamin Frey, Berglen (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 982 days.

(21) Appl. No.: 16/625,441

(22) PCT Filed: Jul. 4, 2018

(86) PCT No.: PCT/EP2018/068152
§ 371 (c)(1),
(2) Date: Feb. 23, 2021

(87) PCT Pub. No.: WO2019/008070
PCT Pub. Date: Jan. 10, 2019

(65) Prior Publication Data
US 2021/0235626 A1    Aug. 5, 2021

(30) Foreign Application Priority Data

Jul. 4, 2017    (DE) .................. 10 2017 211 409.6

(51) Int. Cl.
*A01G 23/099*    (2006.01)
*B24B 7/28*    (2006.01)
*B27B 17/00*    (2006.01)

(52) U.S. Cl.
CPC .......... *A01G 23/099* (2013.01); *B24B 7/28* (2013.01); *B27B 17/00* (2013.01)

(58) Field of Classification Search
None
See application file for complete search history.

(56) References Cited

U.S. PATENT DOCUMENTS 6,408,906 B1    6/2002    Moon et al.
10,131,065 B2    11/2018    Franzius
(Continued)

FOREIGN PATENT DOCUMENTS

CN    201989131 U    9/2011
CN    104170661 A    12/2014
(Continued)

OTHER PUBLICATIONS

Chinese-language Office Action issued in Chinese Application No. 201880057130.5 dated Jun. 20, 2022 with English translation (11 pages).
(Continued)

*Primary Examiner* — Whitney Moore
(74) *Attorney, Agent, or Firm* — Crowell & Moring LLP

(57) ABSTRACT

A garden and/or forestry system has a hand-held gardening and/or forestry processing apparatus, and an assistance device, which is formed separately from the gardening and/or forestry processing apparatus and which is designed to support a user in operation of the gardening and/or forestry processing apparatus. The assistance device has a user interface, by which the assistance device is controllable by user inputs. The hand-held gardening and/or forestry processing apparatus has a user-actuable operator control element for user inputs to the user interface.

12 Claims, 2 Drawing Sheets

(56) References Cited

U.S. PATENT DOCUMENTS

| | | | |
|---|---|---|---|
| 2007/0294991 A1 | 12/2007 | Medina et al. | |
| 2017/0020064 A1 | 1/2017 | Doughty et al. | |
| 2017/0055433 A1 | 3/2017 | Jamison | |
| 2017/0086396 A1 | 3/2017 | Burch | |
| 2018/0320651 A1* | 11/2018 | Chen | F02B 75/16 |
| 2022/0118598 A1* | 4/2022 | Roitsch | H01M 10/441 |

FOREIGN PATENT DOCUMENTS

| | | |
|---|---|---|
| CN | 204598688 U | 9/2015 |
| CN | 204948748 U | 1/2016 |
| CN | 204948754 U | 1/2016 |
| EP | 3 112 089 A1 | 1/2017 |
| EP | 3 085 223 B1 | 12/2017 |
| WO | WO 2016/098040 A1 | 6/2016 |
| WO | WO 2017/053909 A1 | 3/2017 |

OTHER PUBLICATIONS

Chinese-language Office Action issued in Chinese Application No. 201880057130.5 dated Nov. 26, 2021 (eight (8) pages).

English translation of document B1 (EP 3 112 089 A1 filed on Dec. 20, 2019) (10 pages).

International Search Report (PCT/ISA/210) issued in PCT Application No. PCT/EP2018/068152 dated Oct. 16, 2018 with English translation (six (6) pages).

German-language Written Opinion (PCT/ISA/237) issued in PCT Application No. PCT/EP2018/068152 dated Oct. 16, 2018 (five (5) pages).

German-language Search Report issued in counterpart German Application No. 10 2017 211 409.6 dated May 4, 2018 with partial English translation (13 pages).

* cited by examiner

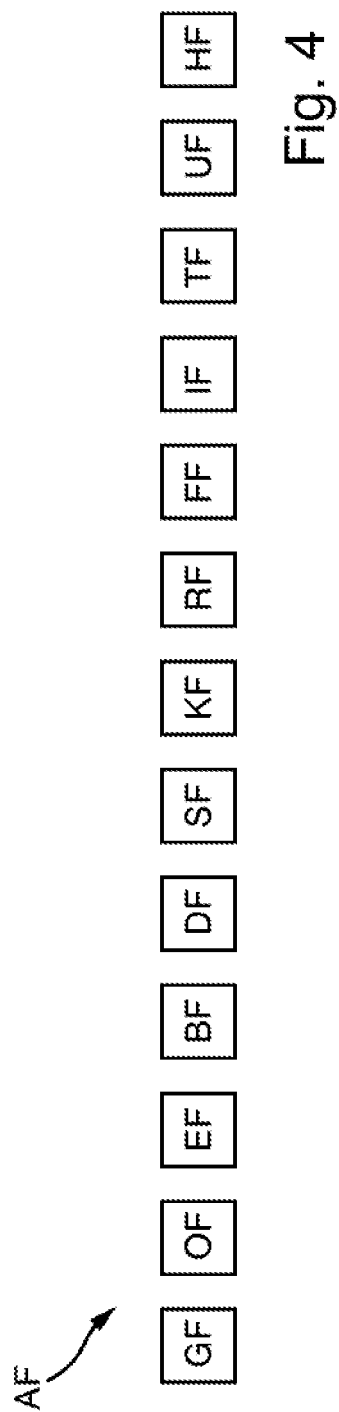
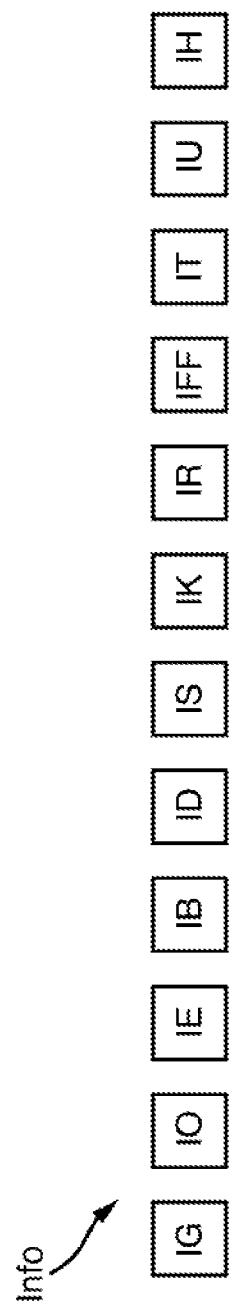

GARDEN AND/OR FORESTRY SYSTEM

BACKGROUND AND SUMMARY OF THE INVENTION

The invention relates to a gardening and/or forestry apparatus system.

Gardening and/or forestry apparatus systems are known.

The invention is based on the object of providing a gardening and/or forestry apparatus system that has improved properties, in particular is user-friendly.

The invention solves this problem by providing a gardening and/or forestry system according to the claimed invention.

The gardening and/or forestry apparatus system according to the invention has a, in particular at least one, hand-held gardening and/or forestry processing apparatus and a, in particular at least one, assistance device. The assistance device is formed separately from the gardening and/or forestry processing apparatus. Furthermore, the assistance device is designed to support, in particular to automatically support, a user in the operation of the gardening and/or forestry processing apparatus. The assistance device has a user interface, by means of which the assistance device can be controlled by user inputs. The gardening and/or forestry processing apparatus has a, in particular at least one, user-actuable operator control element for user inputs to the user interface.

The gardening and/or forestry apparatus system makes it possible for the user to process an object by means of the hand-held gardening and/or forestry processing apparatus. In this case, the assistance device can support the user. By means of the user-actuable operator control element, the user can control the assistance device, in particular without having to let go of the gardening and/or forestry processing apparatus, in particular without having to put it down. The operation of the gardening and/or forestry processing apparatus therefore does not need to be interrupted.

Hand-held gardening and/or forestry apparatus can mean that the gardening and/or forestry apparatus can have a maximum mass of at most 50 kilograms (kg), in particular of 20 kg, in particular of 10 kg. In particular, the gardening and/or forestry apparatus may be designed as a hand-portable gardening and/or forestry apparatus.

Separately can mean that the assistance device can be designed to be physically separate from the gardening and/or forestry processing apparatus and/or does not need to be arranged, in particular secured, to the gardening and/or forestry processing apparatus.

The user-actuable operator control element can ensure safe operation and control, in particular in the rough environment of the gardening and/or forestry work.

The gardening and/or forestry processing apparatus may have a drive motor system for operating the gardening and/or forestry processing apparatus. The drive motor system may have a user actuation element for actuating the drive motor system. The user actuation element may satisfy a function different from the user-actuable operator control element. In particular, the user actuation element may be different from the user-actuable operator control element, in particular may be designed to be separate from the user-actuable operator control element.

In one development of the invention, the hand-held gardening and/or forestry processing apparatus has a saw or a pole-mounted pruner or a brush cutter or a hedge trimmer or a hedge cutter or a blower or a leaf blower or an angle grinder. The saw or the pole-mounted pruner may in each case make it possible to process the object in the form of a tree, in particular a tree trunk. In particular, the saw may be a motor saw and/or a chainsaw. The brush cutter may make it possible to process the object in the form of a green area, in particular a meadow with a lawn. The hedge trimmer or the hedge cutter may in each case make it possible to process the object in the form of a hedge and/or a shrub or bush. The blower or the leaf blower may in each case make it possible to process the object in the form of an open space, in particular an unsealed ground, in particular a green area, in particular at least partly covered with leaves or foliage.

In one development of the invention, the gardening and/or forestry apparatus system has a detection device. The detection device is designed to detect, in particular automatically, a property of the gardening and/or forestry processing apparatus and/or a property of the object to be processed by means of the gardening and/or forestry processing apparatus. The detection can be controlled by means of the user-actuable operator control element. The assistance device is designed to support the user depending on the detected property. The property may have or be a value and/or an amount. The property of the gardening and/or forestry processing apparatus may have or be an orientation or an alignment, in particular an angle, a position, a distance, a sound generated by an operation of the drive motor system, if present, and/or an apparatus state. In particular, the apparatus state may have or be a sharpness of a tool of the gardening and/or forestry processing apparatus and/or a fill level, in particular a fuel and/or oil fill level. Based on the orientation and/or the position, a setback of the gardening and/or forestry processing apparatus can be detected. The property of the object may have or be an, in particular at least one, orientation, a, in particular at least one, position and/or an, in particular at least one, distance, in particular a length, and/or an, in particular at least one, surface and/or an, in particular at least one, shape. In particular, the user-actuable operator control element can be used to control in which operating situation or processing situation the gardening and/or forestry processing apparatus may be. In the case of the saw, the situation can be a felling, debranching or cutting or cutting to length of the tree. In the case of cutting, the orientation of the object can be detected based on the alignment of the gardening and/or forestry processing apparatus. In particular, the gardening and/or forestry processing apparatus or the assistance device may have the detection device.

In one configuration of the invention, the detection device has a camera and/or an inertial measurement unit and/or a spirit level and/or a compass and/or a local position determination apparatus and/or a satellite position determination apparatus and/or a sound transducer and/or a range finder and/or a tachometer and/or a thermometer and/or an apparatus operating sensor. The camera may have a stereo camera and/or a TOF camera for depth information. TOF cameras are 3D camera systems that can measure distances using the time-of-flight method. In particular, the assistance device may have the camera. The inertial measurement unit may have at least one acceleration sensor and/or at least one rate of rotation sensor. In particular, the gardening and/or forestry processing apparatus may have the inertial measurement unit. The spirit level may be designed as an electrical or digital spirit level. In particular, the gardening and/or forestry processing apparatus may have the spirit level. The compass may be designed as an electrical or digital compass. In particular, the gardening and/or forestry processing apparatus may have the compass. The local positioning system apparatus may advantageously be based on one or more different technologies, such as distance measurements to nodes, optical signals, radio waves, magnetic fields, acoustic signals, ultra-wide-band, Bluetooth, WLAN, ultrasound and/or RFID. The satellite position determination apparatus may be designed for one or more satellite position determination systems such as NAVSTAR GPS, GLONASS, Galileo and/or BeiDou. In addition or as an alternative, the satellite position determination apparatus may be designed as an RTK (real time kinematic) satellite position determination apparatus and/or as a differential satellite position determination apparatus. The sound transducer may have or be a microphone. The range finder may be designed as a radio distance meter or a laser distance meter. In particular, the gardening and/or forestry processing apparatus may have the tachometer and/or the thermometer and/or the apparatus operating sensor.

In one development of the invention, the gardening and/or forestry apparatus system has an output device. The output device is designed to output, in particular automatically, assistance information to the user. The assistance information may have or be the property of the gardening and/or forestry processing apparatus and/or the property of the object. In addition or as an alternative, the assistance information may be based on the property. Further in addition or as an alternative, the assistance information may have or be an indication for the user to achieve the property, which may in particular be predetermined, and/or to change the property. In particular, the gardening and/or forestry processing apparatus or the assistance device may have the output device.

In one configuration of the invention, the output device has a display and/or a sound generator and/or a vibration device. The display may have or be an LED, in particular an OLED, or a display screen, in particular an LCD display screen. In particular, the display may be designed to display the assistance information in a field of view of the user, in particular in front of the object to be processed, if present, and/or to project or display it in same, in particular in the operation of the gardening and/or forestry processing apparatus. The display may be referred to as a head-up display screen. This can be referred to as virtual reality and/or as augmented reality. The sound generator may have or be a loudspeaker.

In one configuration of the invention, the gardening and/or forestry apparatus system has a protective helmet, face and/or hearing protection, safety glasses, a protective glove, a smart watch, a bracelet, an armband and/or a smartphone, on which the detection device and/or the output device are/is arranged, in particular are/is integrated. This makes it possible for the detection device and/or the output device to be worn on the body of the user. In particular, the display, if present, may be designed to display or project the assistance information on a visor of the protective helmet, the face and/or hearing protection and/or the safety glasses, if present. The display may be referred to as a head-mounted display screen.

In one development of the invention, the user-actuable operator control element has a rotary and/or push button and/or a touchpad.

In one development, the hand-held gardening and/or forestry processing apparatus has a handle. The user-actuable operator control element is arranged in the region of the handle. In the area of the handle may mean, within finger reach of the handle, at a distance of in particular a maximum of 10 centimeters (cm), in particular a maximum of 5 cm, in particular a maximum of 2 cm. In particular, the user-actuable operator control element may be arranged on the handle.

In one development of the invention, the user interface and the user-actuable operator control element are designed to interact or cooperate with one another wirelessly, in particular by means of radio.

In one development of the invention, the assistance device has various assistance functions or assistance modes, in particular in each case, for assisting, in particular automatically, the user in the operation of the gardening and/or forestry processing apparatus. In addition or as an alternative, the gardening and/or forestry apparatus system has different assistance devices having different assistance functions or assistance modes, in particular in each case for assisting, in particular automatically, the user in the operation of the gardening and/or forestry processing apparatus. Furthermore, the user-actuable operator control element is designed to select one, in particular or more and/or each, of the assistance functions, in particular by the user. In addition or as an alternative, the gardening and/or forestry processing apparatus has various user-actuable operator control elements, in particular in each case, designed to select one, in particular or more and/or each, of the assistance functions, in particular by the user.

In particular, the assistance devices, in particular each assistance device, may be formed separately from the gardening and/or forestry processing apparatus. In addition or as an alternative, the assistance devices, in particular each assistance device, may be designed to support, in particular to automatically support, the user in the operation of the gardening and/or forestry processing apparatus. Further in addition or as an alternative, the assistance devices, in particular each assistance device, may have a user interface, by means of which the, in particular respective, assistance device can be controllable by user inputs. Further in addition or as an alternative, the user-actuable operator control elements, in particular each user-actuable operator control element, may be designed for user inputs to the, in particular respective, user interface(s). Further in addition or as an alternative, the user-actuable operator control elements, in particular each user-actuable operator control element, may be assigned to the assistance devices, if present, and/or to the assistance functions. In particular, a first user-actuable operator control element of the user-actuable operator control elements may be designed to select a first assistance function of the assistance functions, and a second user-actuable operator control element of the user-actuable operator control elements that is different from the first may be configured to select a second assistance function of the assistance functions that is different from the first. Further in addition or as an alternative, the user-actuable operator control elements, in particular each user-actuable operator control element, may be formed separately from one another. Further in addition or as an alternative, the assistance devices, in particular each assistance device, may be formed separately from one another. Further in addition or as an alternative, each of the assistance devices, in particular at least one of the assistance devices, may have one, in particular at least one, of the assistance functions. Further in addition, the selection of one, in particular or more, of the assistance functions may differ from an actuation or triggering within a selected assistance function. Further in addition or as an alternative, one, in particular or more, of the assistant functions may have several, in particular different, sub-assistance functions. The user-actuable operator control element(s) may be designed to select the sub-assistance functions.

In one configuration of the invention, the various assistance functions have an apparatus function, an object function, a detection function or a measurement function, an operating function or a processing function, a documentation function, an evaluation function, an accounting function or cost function, a recording function, an output function, an information function, a transmission function or transfer function, a user function and/or an auxiliary function.

In particular, the apparatus function may have or be an assistance function with respect to or depending on or based on an, in particular the, in particular detected, property of the gardening and/or forestry processing apparatus. In particular, the apparatus function may have several, in particular different, sub-assistance functions with regard to several, in particular different, properties of the gardening and/or forestry processing apparatus. In addition or as an alternative, the object function may have or be an assistance function with respect to or depending on or based on a, in particular the, in particular detected, property of the object. In particular, the object function may have several, in particular different, sub-assistance functions with regard to several, in particular different, properties of the object. Further in addition or as an alternative, the detection function may have or be an assistance function with respect to or depending on or based on a property of the detection device, if present, and/or a, in particular the, property of the gardening and/or forestry processing apparatus and/or the object, in particular to be detected. In particular, the detection function may have a plurality of, in particular different, sub-assistance functions with regard to several, in particular different, properties of the detection device and/or several, in particular different, properties of the gardening and/or forestry processing apparatus and/or of the object, in particular to be detected. Further in addition or as an alternative, the operating function may have or be an assistance function with respect to or depending on or based on an operating situation or processing situation, in particular of the gardening and/or forestry processing apparatus. In particular, the operating function may have several, in particular different, sub-assistance functions with regard to several, in particular different, operating situations or processing situations, in particular of the gardening and/or forestry processing apparatus, in particular a detection assistance function, a felling assistance function, a debranching assistance function and/or a cutting assistance function. Further in addition or as an alternative, the documentation function may enable or provide support for a further operation, in particular a further operating step, in particular by means of the gardening and/or forestry processing apparatus, or a further processing, in particular a further processing step, in particular of the object. Further in addition or as an alternative, the evaluation function may enable or provide an evaluation of a, in particular the, in particular detected, property of the gardening and/or forestry processing apparatus and/or of the object. Further in addition or as an alternative, the accounting function may enable or provide accounting with respect to or depending on or based on a, in particular the, in particular detected, property of the gardening and/or forestry processing apparatus and/or of the object. Further in addition or as an alternative, the recording function may enable or provide recording with respect to or depending on or based on a, in particular the, in particular detected, property of the gardening and/or forestry processing apparatus and/or of the object. Further in addition or as an alternative, the output function may have or be an assistance function with respect to or depending on or based on a property of the output device, if present. In particular, the output function may have several, in particular different, sub-assistance functions with respect to several, in particular different, properties of the output device, in particular a display function, a sound generator function and/or a vibration device function. Further in addition or as an alternative, the information function may have or be an assistance function with respect to or depending on or based on the assistance information, if present. Further in addition or as an alternative, the transmission function may enable or provide a transmission with respect to or depending on or based on a, in particular the, in particular detected, property of the gardening and/or forestry processing apparatus and/or of the object. Furthermore in addition or as an alternative, the user function may be referred to as comfort function. Further in addition or as an alternative, the auxiliary function may enable or provide help to the user.

In one configuration, the assistance information, if present, has apparatus information, object information, detection information or measurement information, operating information or processing information, documentation information, evaluation information, accounting information or cost information, recording information, output information, transmission information or transfer information, user information and/or auxiliary information.

In particular, the apparatus information may have or be assistance information with respect to or depending on or based on a, in particular the, in particular detected, property of the gardening and/or forestry processing apparatus. In addition or as an alternative, the object information may have or be assistance information with regard to or depending on or based on a, in particular the, in particular detected, property of the object. Further in addition or as an alternative, the detection information may have or be assistance information with respect to or depending on or based on a property of the detection device, if present, and/or a, in particular the, property of the gardening and/or forestry processing apparatus, in particular to be detected and/or of the object. Further in addition or as an alternative, the operating information may have or be assistance information with respect to or depending on or based on an operating situation or processing situation, in particular of the gardening and/or forestry processing apparatus. In particular, the operating information may have several, in particular different, sub-assistance information with regard to several, in particular different, operating situations or processing situations, in particular of the gardening and/or forestry processing apparatus, in particular felling assistance information, debranching assistance information and/or cutting assistance information. Further in addition or as an alternative, the documentation information may have or be assistance information with respect to or depending on or based on support for a further operation, in particular a further operating step, in particular by means of the gardening and/or forestry processing apparatus, or a further processing, in particular a further processing step, in particular of the object. Further in addition or as an alternative, the evaluation information may have or be assistance information with respect to or depending on or based on an evaluation of a, in particular the, in particular detected, property of the gardening and/or forestry processing apparatus and/or of the object. Further in addition or as an alternative, the accounting information may have or be assistance information with respect to or depending on or based on an account with respect to or depending on or based on a, in particular the, in particular detected, property of the gardening and/or forestry processing apparatus and/or of the object. Further in addition or as an alternative, the recording information may have or be assistance information with respect to or depending on or based on a recording with respect to or depending on or based on a, in particular the, in particular detected, property of the gardening and/or forestry processing apparatus and/or of the object. Further in addition or as an alternative, the output information may have or be assistance information with respect to or depending on or based on a property of the output device, if present. In particular, the output information may have several, in particular different, pieces of sub-assistance information with respect to several, in particular different, properties of the output device, in particular display information, sound generator information and/or vibration device information. Further in addition or as an alternative, the transmission information may have or be assistance information with respect to or depending on or based on a transmission with respect to or depending on or based on a, in particular the, in particular detected, property of the gardening and/or forestry processing apparatus and/or of the object. Furthermore in addition or as an alternative, the user information may be referred to as comfort information. Further in addition or as an alternative, the auxiliary information may have or be assistance information with respect to or depending on or based on help to the user.

Further advantages and aspects of the invention will emerge from the claims and from the following description of preferred exemplary embodiments of the invention, which are explained below with reference to the figures.

BRIEF DESCRIPTION OF THE DRAWINGS

FIG. 4 shows various assistance functions of the gardening and/or forestry apparatus system of FIG. 1.

FIG. 5 shows various pieces of assistance information of the gardening and/or forestry apparatus system of FIG. 1.

DETAILED DESCRIPTION OF THE DRAWINGS

Figure 1:
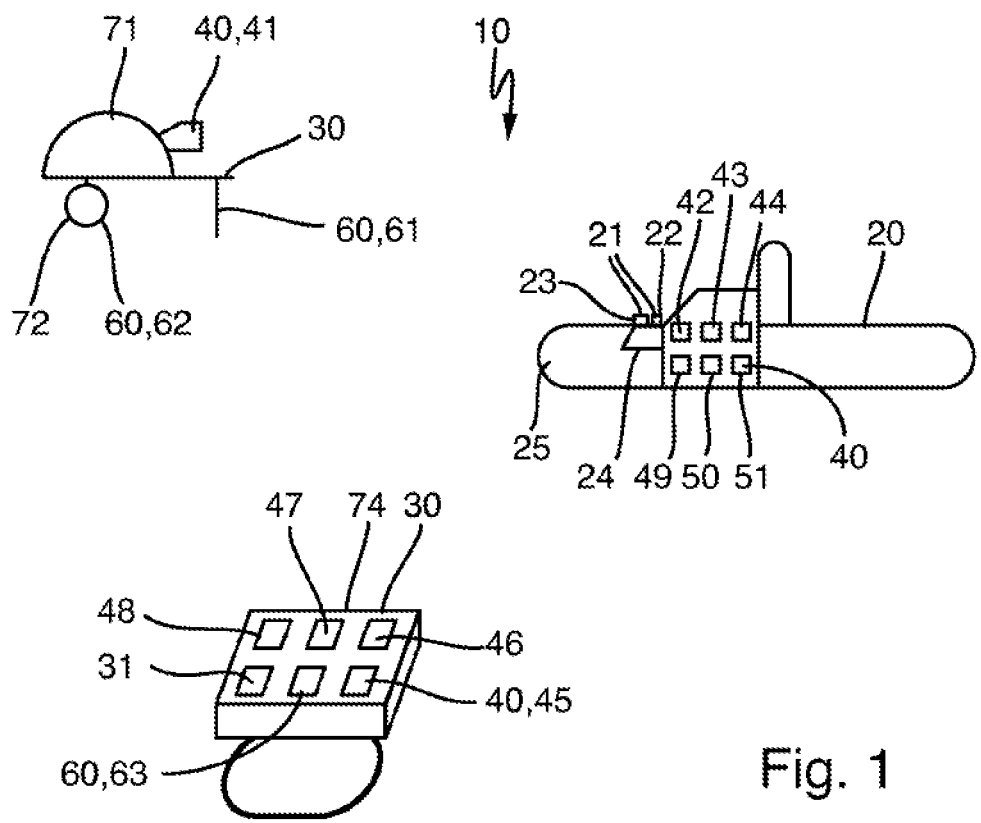
FIG. 1 shows a perspective view of a gardening and/or forestry apparatus system according to the invention.
Figures 2, 3:
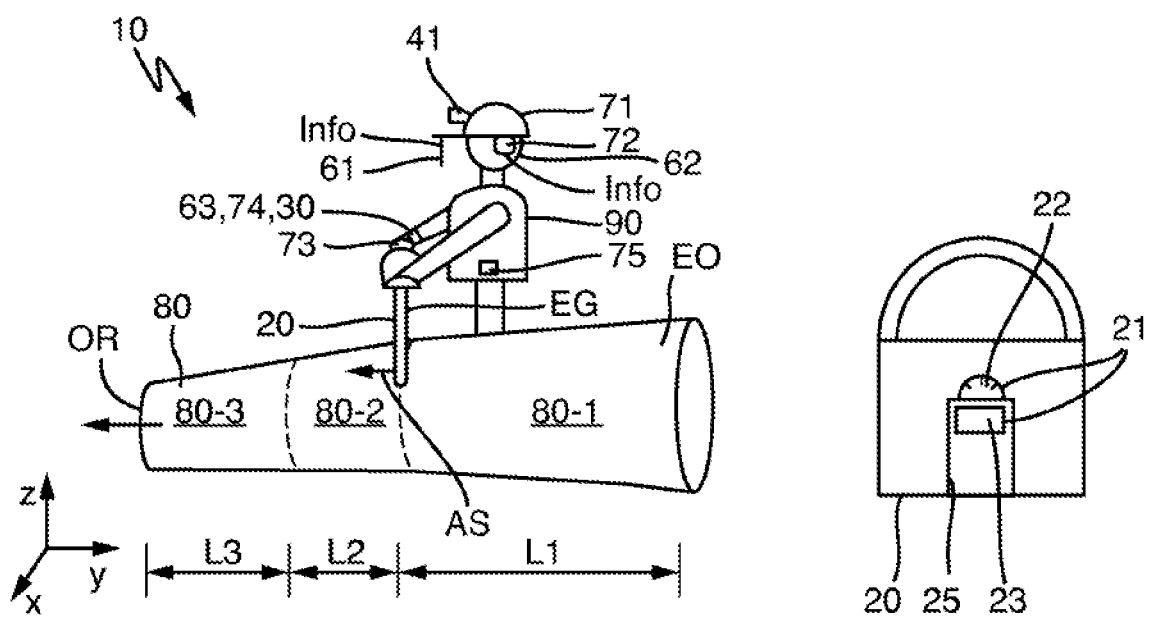
FIG. 2 shows a rear side view of a hand-held gardening and/or forestry processing apparatus of the gardening and/or forestry apparatus system of FIG. 1.
FIG. 3 shows a further perspective view of the gardening and/or forestry apparatus system of FIG. 1 during operation.

FIGS. 1 to 3 show a gardening and/or forestry apparatus system 10. The gardening and/or forestry apparatus system 10 has a hand-held gardening and/or forestry processing apparatus 20 and an assistance device 30. The assistance device 30 is formed separately from the gardening and/or forestry processing apparatus 20. Furthermore, the assistance device 30 is designed to support a user 90 in the operation of the gardening and/or forestry processing apparatus 20. The assistance device 30 has a user interface 31, by means of which the assistance device 30 can be controlled by user inputs. The gardening and/or forestry processing apparatus 20 has a user-actuable operator control element 21 for user inputs to the user interface 31.

In the exemplary embodiment shown, the hand-held gardening and/or forestry processing apparatus 20 is a saw, in particular a motor-driven chainsaw. In alternative exemplary embodiments, the gardening and/or forestry processing apparatus may have or be a a pole-mounted pruner or a brush cutter or a hedge trimmer or a hedge cutter or a blower or a leaf blower or an angle grinder. In detail, the gardening and/or forestry processing apparatus 20 has a user actuation element 24 in the form of a button for operating or actuating the gardening and/or forestry processing apparatus 20.

Furthermore, the hand-held gardening and/or forestry processing apparatus 20 has a handle 25. The user-actuable operator control element 21 is arranged in the region of the handle 25, in particular on the handle 25.

In detail, the user-actuable operator control element 21 has a rotary and/or push button 22 and a touchpad 23. In alternative exemplary embodiments, the user-actuable operator control element can have either the rotary button or the push button or the touchpad.

Moreover, the user interface 31 and the user-actuable operator control element 21 are designed to interact wirelessly with one another.

Furthermore, the gardening and/or forestry apparatus system 10 has a detection device 40. The detection device 40 is designed to detect a property EG of the gardening and/or forestry processing apparatus 20 and a property EO of the object 80 to be processed by means of the gardening and/or forestry processing apparatus 20. In alternative exemplary embodiments, the detection device may be designed to detect either the property of the gardening and/or forestry processing apparatus or the property of the object. The detection can be controlled by means of the user-actuable operator control element 21. The assistance device 30 is designed to support the user 90 depending on the detected property EG, EO. In the exemplary embodiment shown, the property EG of the gardening and/or forestry processing apparatus 20 is an orientation AS. The property EO of the object 80 is a position and a length.

In detail, the detection device has a camera 41, an inertial measurement unit 42, a spirit level 43, a compass 44, a local position determination apparatus 45, a satellite position determination apparatus 46, a sound transducer 47, a range finder 48, a tachometer 49, a thermometer 50 and an apparatus operating sensor 51. In alternative exemplary embodiments, the detection device may have either the camera or the inertial measurement unit or the spirit level or the compass or the local position determination apparatus or the satellite position determination apparatus or the sound transducer or the range finder or the tachometer or the thermometer or the device operating sensor. In the exemplary embodiment shown, the gardening and/or forestry processing apparatus 20 has the inertial measurement unit 42, the spirit level 43, the compass 44, the tachometer 49, the thermometer 50 and the apparatus operating sensor 51. The assistance device 30 has the camera 41, the local position determination apparatus 45, the satellite position determination apparatus 46, the sound transducer 47 and the range finder 48.

Furthermore, the gardening and/or forestry apparatus system 10 has an output device 60. The output device 60 is designed to output assistance information Info to the user 90.

In detail, the output device 60 has a display 61 and a sound generator 62 and a vibration device 63. In alternative exemplary embodiments, the output device may have either the display or the sound generator or the vibration device. In the exemplary embodiment shown, the assistance device 30 has the display 61, the sound generator 62 and the vibration device 63.

Furthermore, the gardening and/or forestry apparatus system 10 has a protective helmet 71, face and/or hearing protection 72, a protective glove 73, a smart watch 74 and a smartphone 75, on which the detection device 40 and/or the output device 60 are/is arranged. In alternative exemplary embodiments, the gardening and/or forestry apparatus system may have either the protective helmet or the face and/or hearing protection or the protective glove or the smart watch or the smartphone, on which the detection device and/or the output device can be arranged. Furthermore, in alternative exemplary embodiments, the gardening and/or forestry apparatus system may have safety glasses, a bracelet and/or an armband, on which the detection device and/or the output device can be arranged.

In the exemplary embodiment shown, the camera 41 is arranged on the protective helmet 71. Furthermore, the display 61 is arranged on the protective helmet 71.

The sound generator 62 is arranged in the form of a loudspeaker on the face and/or hearing protection 72.

The local position determination apparatus 45, the satellite position determination apparatus 46, the sound transducer 47 and the range finder 48 are arranged on the smart watch 74. Furthermore, the vibration device 63 is arranged on the smart watch 74.

In the exemplary embodiment shown, the user 90 wears the protective helmet 71 and the face and/or hearing protection 72 on his or her head and the smart watch 74 on his or her, in particular right, arm, as can be seen in FIG. 3.

In addition, the assistance device 30 has various assistance functions AF for assisting the user 90 in the operation of the gardening and/or forestry processing apparatus 20, as can be seen in FIG. 4. In an alternative exemplary embodiment, the gardening and/or forestry apparatus system may have different assistance devices having different assistance functions for assisting the user in the operation of the gardening and/or forestry processing apparatus. Furthermore, the user-actuable operator control element 21 is designed to select one of the assistance functions AF. In alternative exemplary embodiments, the gardening and/or forestry processing apparatus may have various user-actuable operator control elements designed to select one of the assistance functions.

In the exemplary embodiment shown, the various assistance functions AF have an apparatus function GF, an object function OF, a detection function EF, an operating function BF, a documentation function DF, an evaluation function SF, an accounting function KF, a recording function RF, an output function FF, an information function IF, a transmission function TF, a user function UF and an auxiliary function HF. In alternative exemplary embodiments, the various assistance functions may include the apparatus function, the object function, the detection function, the operating function, the documentation function, the evaluation function, the accounting function, the recording function, the output function, the information function, the transmission function, the user function and/or the auxiliary function.

Furthermore, in the exemplary embodiment shown, the assistance information Info has apparatus information IG, object information IO, detection information IE, operating information IB, documentation information ID, evaluation information IS, accounting information IK, recording information IR, output information IFF, transmission information IT, user information IU and auxiliary information IH, as can be seen in FIG. 5. In alternative exemplary embodiments, the assistance information may include the apparatus information, the object information, the detection information, the operating information, the documentation information, the evaluation information, the accounting information, the recording information, the output information, the transmission information, the user information and/or the auxiliary information.

The user 90 should process the object 80 in the form of a felled tree trunk by means of the gardening and/or forestry processing apparatus 20, in particular cut it into three sections 80-1, 80-2, 80-3, in particular by separating cuts as indicated in FIG. 3 by dashed lines. After cutting, each of the three sections 80-1, 80-2, 80-3 should have a section-specific length L1, L2, L3 previously ascertained by holding the tree trunk 80. The lengths L1, L2, L3 are known and/or have been specified to the gardening and/or forestry apparatus system 10.

At the beginning, the user 90 uses the user-actuable operator control element 21 to control that a detection situation of the object 80 is present. In other words: the user 90 selects by means of the user-actuable operator control element 21 the object function OF, in particular a sub-object function position and length assistance function, the detection function EF, in particular a sub-detection function position and length assistance function, and the operating function BF, in particular a sub-operating function detection assistance function for cutting. In detail, the user 90 holds the smart watch 74 with the satellite position determination apparatus 46 against an end of the tree trunk 80 on the right in FIG. 3 and actuates or triggers the user-actuable operator control element 21. The position of the right end is therefore detected, in particular by means of the satellite position determination apparatus 46, and stored. In addition, the right end is detected by means of the camera 41. Subsequently, the user 90 holds the smart watch 74 with the satellite position determination apparatus 46 against an end of the tree trunk 80 on the left in FIG. 3 and actuates or triggers the user-actuable operator control element 21. The position of the left end is therefore detected, in particular by means of the satellite position determination apparatus 46, and stored. In addition, the left end is detected by means of the camera 41.

After the ends have been detected, the user 90 moves to the right along the tree trunk 60 in FIG. 3 with the satellite position determination apparatus 46 and the camera 41. If a distance detected by the right end corresponds to the predetermined length L1, then the output device 60 outputs the assistance information Info, in particular the reaching of the length L1. In other words; the assistance information Info has the object information IO, in particular sub-object information position and length assistance information, and the operating information BF, in particular sub-operating information cutting assistance information.

In the exemplary embodiment shown, the assistance information Info is acoustically output to the user 90 by a voice output and/or a sound by the sound generator 62. Furthermore, the assistance information Info is output haptically by vibrating the vibration device 63. In addition, the assistance information Info is output optically by a display on the display 61 of the protective helmet 71. In detail, the protective helmet 71 has a visor. The display 61 is designed to display the assistance information Info on the visor of the protective helmet 71 in a field of view of the user 90, in particular in front of the tree trunk 80 at a suitable location, or to project it into the latter, in particular in the form of the dashed dividing line. In detail, the output device 60 or its display 61 and the detection device 40 or its camera 41 are designed to interact with one another.

In response to the assistance information Info, the user 90 uses the user-actuable operator control element 21 to control that the object 80 is cut. In other words: the user 90 selects by means of the user-actuable operator control element 21, in particular additionally, the detection function EF, in particular a sub-detection function alignment assistance function, and the operating function BF, in particular a cutting assistance function. The user 90 then cuts the tree trunk 80 with the saw 20. In detail, he separates section 80-1.

During the cutting, an alignment AS of the gardening and/or forestry processing apparatus 20 is detected by means of the compass 44. Based on the alignment AS, an alignment OR of the object 80 is detected, in particular a compass direction.

Furthermore, the user 90 can detect a new right end in FIG. 3 by means of actuating or triggering the user-actuable operator control element 21, detect the length L2 and cut the tree trunk 80 into the sections 80-2, 80-3 according to the length L2.

The user 90 can therefore process the object 80 without interruption, in particular without having to put the gardening and/or forestry processing apparatus 20 down. As the exemplary embodiments shown and explained above make clear, the invention provides an advantageous gardening and/or forestry apparatus system which has improved properties, in particular is user-friendly.

What is claimed is:

1. A gardening and/or forestry apparatus system, comprising:
    a hand-held gardening and/or forestry processing apparatus having a handle and a detection device, the detection device having a camera and/or an inertial measurement unit and being designed to detect a property of the gardening and/or forestry processing apparatus and/or a property of an object to be processed by the gardening and/or forestry processing apparatus;
    an assistance device, which is formed separately from the gardening and/or forestry processing apparatus and which is designed to support a user in operation of the gardening and/or forestry processing apparatus, wherein
    the assistance device has a user interface, by which the assistance device is controllable by user inputs,
    the hand-held gardening and/or forestry processing apparatus further has a user-actuable operator control element for user inputs to the user interface, wherein the user-actuable operator control element is arranged in a region of the handle,
    the detection device is controllable by the user-actuable operator control element, and
    the assistance device is designed to support the user depending on the detected property.

2. The gardening and/or forestry apparatus system as claimed in claim 1, wherein
    the hand-held gardening and/or forestry processing apparatus is a saw, a pole-mounted pruner, a brush cutter, a hedge trimmer, a hedge cutter, a blower, a leaf blower, or an angle grinder.

3. The gardening and/or forestry apparatus system as claimed in claim 1, wherein the detection device further has a spirit level, a compass, a local position determination apparatus, a satellite position determination apparatus, a sound transducer, a range finder, a tachometer, a thermometer, and/or an apparatus operating sensor.

4. The gardening and/or forestry apparatus system as claimed in claim 1, further comprising:
    an output device, which is designed to output assistance information to the user.

5. The gardening and/or forestry apparatus system as claimed in claim 4, wherein
    the output device has a display, a sound generator, and/or a vibration device.

6. The gardening and/or forestry apparatus system as claimed in claim 4, further comprising:
    a protective helmet, face and/or hearing protection, safety glasses, a protective glove, a smart watch, a bracelet, an armband, and/or a smartphone, on which the detection device and/or the output device are arranged.

7. The gardening and/or forestry apparatus system as claimed in claim 1, wherein
    the user-actuable operator control element has a rotary button, a push button and/or a touchpad.

8. The gardening and/or forestry apparatus system as claimed in claim 1, wherein
    the user interface and the user-actuable operator control element are designed to interact wirelessly with one another.

9. The gardening and/or forestry apparatus system as claimed in claim 1, wherein
    the assistance device has various assistance functions to support the user in the operation of the gardening and/or forestry processing apparatus, and/or the gardening and/or forestry apparatus system has various assistance devices having different assistance functions to support the user in the operation of the gardening and/or forestry processing apparatus, and
    wherein the user-actuable operator control element is designed to select one of the assistance functions, and/or wherein the gardening and/or forestry processing apparatus has various user-actuable operator control elements designed to select one of the assistance functions.

10. The gardening and/or forestry apparatus system as claimed in claim 9, wherein
    the various assistance functions have an apparatus function, an object function, a detection function, an operating function, a documentation function, an evaluation function, an accounting function, a recording function, an output function, an information function, a transmission function, a user function, and/or an auxiliary function.

11. The gardening and/or forestry apparatus system as claimed in claim 10, wherein,
    the assistance information has apparatus information, object information, detection information, operating information, documentation information, evaluation information, accounting information, recording information, output information, transmission information, user information, and/or auxiliary information.

12. The gardening and/or forestry apparatus system as claimed in claim 9, wherein,
    the assistance information has apparatus information, object information, detection information, operating information, documentation information, evaluation information, accounting information, recording information, output information, transmission information, user information, and/or auxiliary information.

* * * * *